United States Patent [19]

Mizuno et al.

[11] Patent Number: 5,612,650
[45] Date of Patent: Mar. 18, 1997

[54] TRANSMITTING DEVICE FOR A FREQUENCY MODULATED DIGITAL TRANSMISSION SIGNAL

[75] Inventors: Takashi Mizuno; Sadao Kokubu; Hisashi Aoki; Yoshiyuki Mizuno; Shinichi Koga, all of Aichi, Japan

[73] Assignee: Kabushiki Kaisha Tokai Rika Denki Seisakusho, Niwa-gun, Japan

[21] Appl. No.: 527,600

[22] Filed: Sep. 13, 1995

[30] Foreign Application Priority Data

Sep. 14, 1994 [JP] Japan ..................... 6-219793

[51] Int. Cl.$^6$ ................................. H04L 27/12
[52] U.S. Cl. .................. 332/100; 331/179; 375/272; 375/306
[58] Field of Search .................... 332/100, 101, 332/102; 375/272, 303, 306; 331/179

[56] References Cited

U.S. PATENT DOCUMENTS 4,368,439  1/1983  Shibuya et al. ................. 332/100
5,136,264  8/1992  Nardozza ....................... 332/102

FOREIGN PATENT DOCUMENTS 997893  7/1965  United Kingdom ............... 332/100

Primary Examiner—Siegfried H. Grimm
Attorney, Agent, or Firm—Morgan, Lewis and Bockius LLP

[57] ABSTRACT

A microcomputer includes therein an operation control part which can be operated when a clock signal is applied thereto by an oscillation circuit. If the operation control part reads out an identification code from an EEPROM, then it switches a control signal to be given to a switching element in accordance with the levels of the respective bits. When the control signal is off, the oscillation frequency of the oscillation circuit is F1. On the other hand, if the control signal is turned on, then one terminal of a capacitor is grounded to thereby switch the oscillation frequency over to F2. The clock signal is divided by a frequency dividing circuit before it is output. The frequency of the output signal after being divided becomes f1 or f2 in accordance with the above switching and the output signal is transmitted in the form of a frequency modulation signal.

7 Claims, 2 Drawing Sheets

TRANSMITTING DEVICE FOR A FREQUENCY MODULATED DIGITAL TRANSMISSION SIGNAL

BACKGROUND OF THE INVENTION

1. Field of the invention

The present invention relates to a transmitting device which switches the frequency of a digital transmission signal to a different frequency equivalent to the level thereof to thereby generate a frequency modulation signal and outputs the digital transmission signal in the form of the thus generated frequency modulation signal.

2. Related art

For example, when driving a load or the like carried on a car by remote control, a transmitting device for operation is used to transmit a remote control signal for the car in the form of an electric wave signal. The electric wave signal can be generated, for example, by frequency modulating a digital transmission signal corresponding to an identification code which is inherently set for the car. When a receiving device provided on the body side of the car receives the electric wave signal, then the electric wave signal is demodulated to the identification code. After then, if the identification code received is decoded and is found identical with the identification code set in the car, then the load corresponding to the identification code is driven or controlled by a drive device or the like.

Conventionally, as a transmitting device of this type, there is known a structure which is shown in FIG. 3. In FIG. 3, a CPU 1 can be operated in accordance with a clock signal for operation which is given by an oscillation circuit 2 for clock. That is, if a transmission switch (not shown) is turned on to thereby instruct the start of transmission, then the CPU 1 reads out an identification code consisting of a combination of "1", "0" digital signals from a memory 3 in which identification codes are stored and, in accordance with the levels of "1", "0" of the respective bits, outputs a control signal to an oscillation circuit 4 for outputting a frequency modulation signal. The frequency modulation signal outputting oscillation circuit 4 is arranged such that, in accordance with the control signal, it switches the oscillation frequency to one of different frequencies f1 and f2 and then outputs a frequency modulation signal equivalent to the identification code. That is, in this manner, the frequency modulation signal equivalent to the identification code is generated and is then output as the electric wave signal.

However, in the above-mentioned conventional transmitting device, the frequency modulation signal outputting oscillation circuit 4 is indispensable to the device, which sets a limit to the size reduction of a transmitting device such as an electric wave key or the like.

SUMMARY OF THE INVENTION

Figure 1:
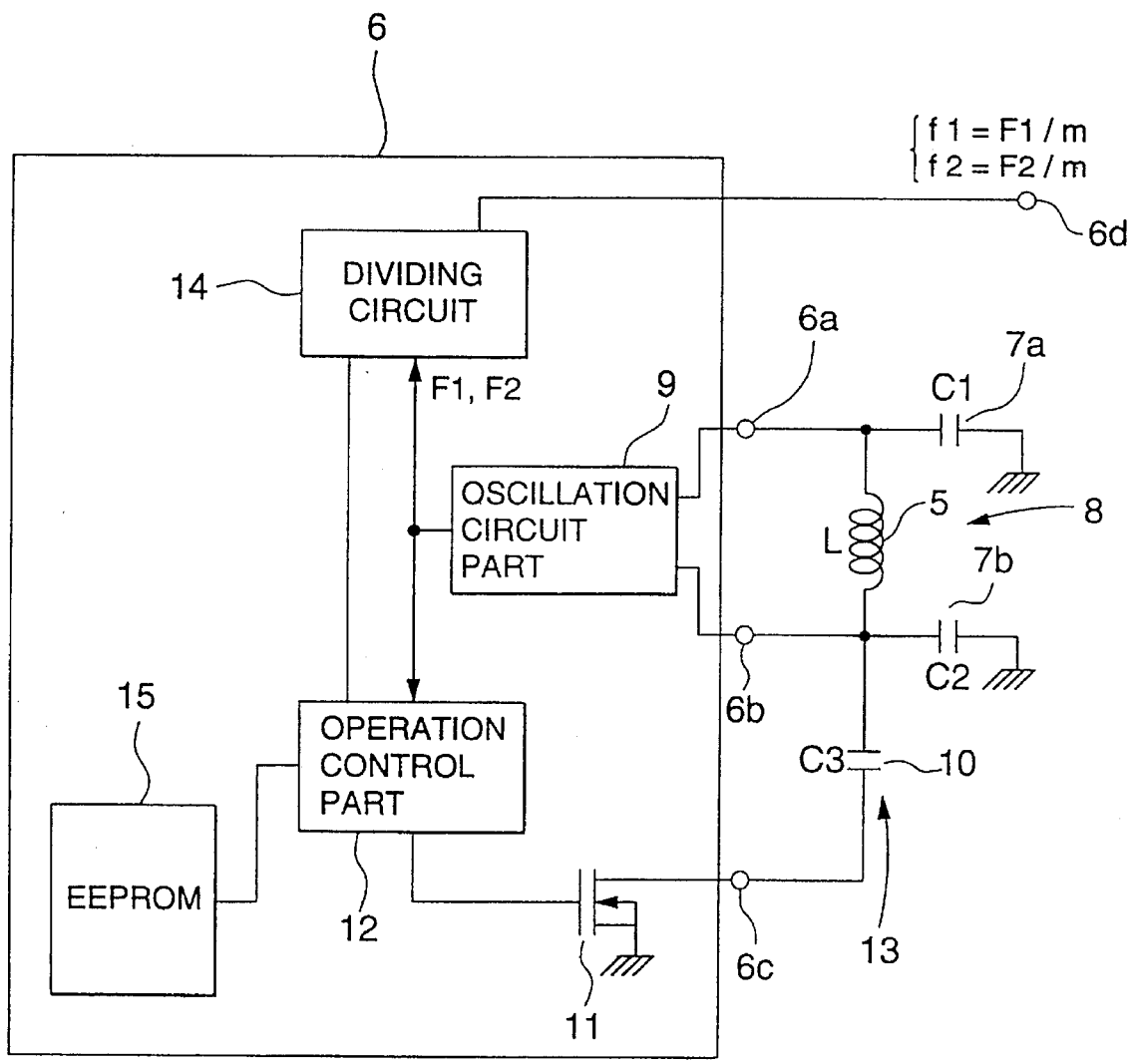
FIG. 1 is a block diagram of a first embodiment of a transmitting device according to the invention, showing the electric structure thereof.

The present invention aims at eliminating the above problem. Accordingly, it is an object of the invention to provide a transmitting device which can be made compact and can reduce costs even without using a frequency modulation signal outputting oscillation circuit which has been necessary in the conventional transmitting device.

In attaining the above object, according to the present invention, there is provided a transmitting device which converts the frequency of a digital transmission signal to a different frequency equivalent to the level of the digital transmission signal to thereby generate a frequency modulation signal and then outputs the digital transmission signal in the form of the thus generated frequency modulation signal, the present transmitting device comprising: an oscillation circuit capable of switching the oscillation frequency of a clock signal to a different frequency; and, control means which can be operated in accordance with a clock signal output from the oscillation circuit, and also which applies a switching signal equivalent to a variation in the level of a digital transmission signal to the oscillation circuit to switch the oscillation frequency of the oscillation circuit to thereby create a clock signal having a different frequency, and then generates a frequency modulation signal in accordance with the thus created clock signal.

In this case, the oscillation circuit may be composed of a resonance circuit consisting of a combination of a coil and a capacitor, and a switching capacitor which, if a switching signal is given thereto from the control means, can be connected to the resonance circuit such that it can switch the oscillation frequency.

Also, the oscillation circuit may include frequency dividing means which performs a given frequency dividing processing on a clock signal generated by the control means and outputs the thus processed signal in the form of a frequency modulation signal.

According to the present transmitting device, the control means can be operated in accordance with a clock signal output from the oscillation circuit. And, when a digital transmission signal is output, the control means applies a switching signal corresponding to a variation in the level of the digital transmission signal to the oscillation circuit to switch the oscillation frequency of the digital transmission signal and, in accordance with the resultant clock signal, generates a frequency modulation signal and then outputs the same.

Also, according to the present transmitting device, the oscillation circuit allows the resonance circuit to output a clock signal having a given oscillation frequency and, if a switching signal is given thereto from the control means, then connects the switching capacitor to the resonance circuit to thereby output a clock signal having a different oscillation frequency switched from its original oscillation frequency. Due to this, there can be obtained a clock signal the oscillation frequency of which varies in accordance with the digital transmission signal.

Further, according to the present transmitting device, a clock signal corresponding to a digital transmission signal generated by the control means is output in the form of a frequency modulation signal after a given frequency dividing processing is performed on the same by the frequency dividing means. Due to this, for a clock signal necessary for the operation of the control means, it is possible to output a frequency modulation signal necessary for transmission, that is, a frequency modulation signal having a frequency different from the frequency of the clock signal.

DETAILED DESCRIPTION OF THE PREFERRED EMBODIMENTS

Now, description will be given below in detail of an embodiment in which the invention is applied to a transmitting device incorporated in an electric wave key of a car with reference to FIGS. 1 and 2. In particular, in FIG. 1 which illustrates the electric structure of the transmitting device, an oscillation circuit 13 for clock signal generation is structured in the following manner. That is, the two terminals of a coil 5 having an inductance L are respectively connected to the input terminals 6a and 6b of a microcomputer 6. Also, one terminal of a capacitor 7a having an electrostatic capacity C1 is connected to the input terminal 6a, while the other terminal thereof is grounded. And, one terminal of a capacitor 7b having an electrostatic capacity C2 is connected to the input terminal 6b, while the other terminal thereof is grounded. The two input terminals 6a and 6b of the microcomputer 6 are respectively connected to an oscillation circuit part 9 which is disposed in the microcomputer 6. Accordingly, the coil 5 and two capacitors 7a and 7b cooperate together in forming a resonance circuit 8 and also they cooperate together with an active element provided within the oscillation circuit part 9 in forming a Colpitts oscillation circuit.

Also, the two terminals of a capacitor 10, which is used to switch an oscillation frequency and has an electrostatic capacity C3, are respectively connected to the input terminals 6b and 6c of the microcomputer 6. The input terminal 6c is grounded through a switching element 11. And, an on or off control signal can be applied to the control terminal of the switching element 11 from an operation control part 12 which serves as control means within the microcomputer 6. Here, the coil 5, capacitors 7a, 7b and 10, oscillation circuit part 9, and switching element 11 cooperate together in forming the oscillation circuit 13.

The oscillation circuit 13 performs an oscillating operation with an oscillation frequency variable in accordance with the on or off state of the switching element 11. That is, in the off state of the switching element 11, the oscillation circuit 13, due to excitation from the oscillation circuit part 9, performs an oscillating operation with an oscillation frequency F1 which can be determined by the inductance L of the coil 5 and the electrostatic capacities C1 and C2 of the capacitors 7a and 7b. On the other hand, in the on state of the switching element 11, the capacitor 10 is connected in parallel to the capacitor 7b so that the electrostatic capacity thereof is changed from C2 into C2+C3, and the oscillation circuit 13 performs an oscillating operation with an oscillation frequency F2. And, the oscillation output of the oscillation circuit 13 is output as a clock signal to the operation control part 12 and a frequency dividing circuit 14 by the oscillation circuit part 9.

The frequency dividing circuit 14 is structured such that it performs a frequency dividing operation, such as an operation to divide a frequency into m parts, on a clock signal having a frequency F1 or F2 given by the oscillation circuit 13 and thus outputs the clock signal in the form of a frequency modulation signal having a frequency f1 (=F1/m) or a frequency f2 (=F2/m). Also, the frequency dividing circuit 14 is arranged such that it receives a control signal (a switching signal) from the operation control part 12, that is, the above-mentioned frequency modulation signal can be output in accordance with the control signal.

An EEPROM 15, which is an electrically rewritable non-volatile memory means, stores therein identification codes respectively to be set inherently in cars in the form of combinations of "1", "0" digital signals, and is also connected to the operation control part 12.

Also, although not shown in the drawings, there is provided an operation switch which is used to lock or unlock the door of a car by remote control. That is, in accordance with the operation of the operation switch, the operation control part 12 outputs a lock signal or an unlock signal in the form of a frequency modulation signal containing therein an identification code in a manner to be described later.

Next, description will be given below of the operation of the present embodiment. When the operation control part 12 starts its operation in accordance with a clock signal of a frequency F1 given by the oscillation circuit 13, it reads out a control program from a ROM (not shown) consisting of program memory mean and executes necessary processings. When no digital transmission is output, a control signal given to the switching element 11 by the operation control part 12 is an off control signal and thus the oscillation circuit 14 gives a clock signal of a frequency F1 to the operation control part 12. Also, a control signal given to the frequency dividing circuit 14 by the operation control part 12 is also an off control signal and thus the output of the frequency dividing circuit 14 is disabled.

In order to output a door lock signal or a door unlock signal, if the operation switch (not shown) is operated to turn on, then the operation control part 12 reads out an identification code from the EEPROM 15 and sets it in a shift register (not shown) provided in the operation control part 12. In response to this, the operation control part 12 applies control signals to the switching element 11 in accordance with the levels of the respective bits of the identification code. For example, if the level of a bit is "1", then the control signal is turned off and, on the other hand, if the level is "0", then the control signal is turned on. At first, the operation control part 12 checks the level of the first bit with reference to the MSB (Most Signification Bit) of the identification code set in the shift register. In this case, since the level of the first bit is "1" (see FIG. 2(a)), the control signal is off (see FIG. 2(b)) and thus the oscillation circuit 13 outputs a clock signal of a frequency F1. At the same time, the control signal to be given to the frequency dividing circuit 14 is turned on and the output of the frequency dividing circuit 14 is enabled.

The clock signal of a frequency F1 is then divided into m parts by the frequency dividing circuit 14 to provide an output signal of a frequency f1. The output signal of a frequency f1 is output from an output terminal 6d of the microcomputer 6, that is, it is output as an electric wave signal through an antenna (not shown) and is transmitted in the air.

Next, in order to check the level of the second bit, the operation control part 12 shifts the identification code set in the shift register one bit to the left, then positions the second bit at the MSB, and checks the level of the second bit. As shown in FIG. 2, since the level of the second bit is "0", the operation control part 12 turns on the control signal to be given to the switching element 11. As a result of this, the oscillation frequency of the signal of the oscillation circuit 13 is switched into a frequency F2 and a clock signal of a frequency F2 is then output.

And, the clock signal of a frequency F2 is divided into m parts by the frequency dividing circuit 14 to provide an output signal of a frequency f2, which is then output as an electric wave signal from the output terminal 6d through an antenna.

After then, similarly, the operation control part 12 shifts the shift register bit by bit to check the levels of the respective bits and allows the frequency dividing circuit 14 to output signals respectively having a frequency f1 or f2 in accordance with the levels "1" or "0" thereof. As results of this, signals, the frequencies of which are modulated in accordance with the identification codes each consisting of a digital transmission signal, are output as shown in a timing chart in FIG. 2.

Figure 2:
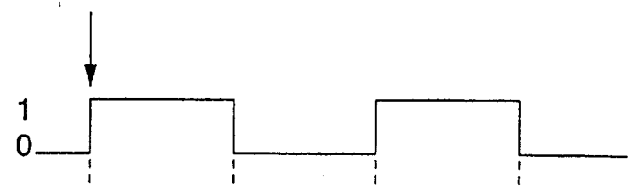
FIGS. 2(a) to (d) are a timing chart employed in the above first embodiment.
Figure 2:
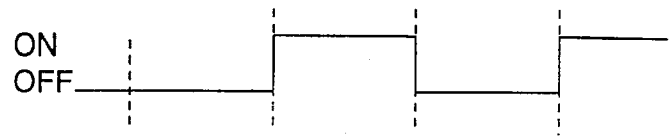
Figure 2:
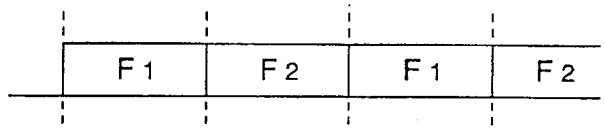
Figure 2:
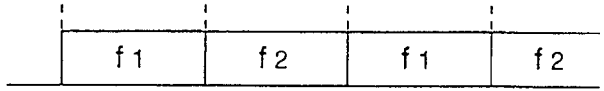
Figure 3:
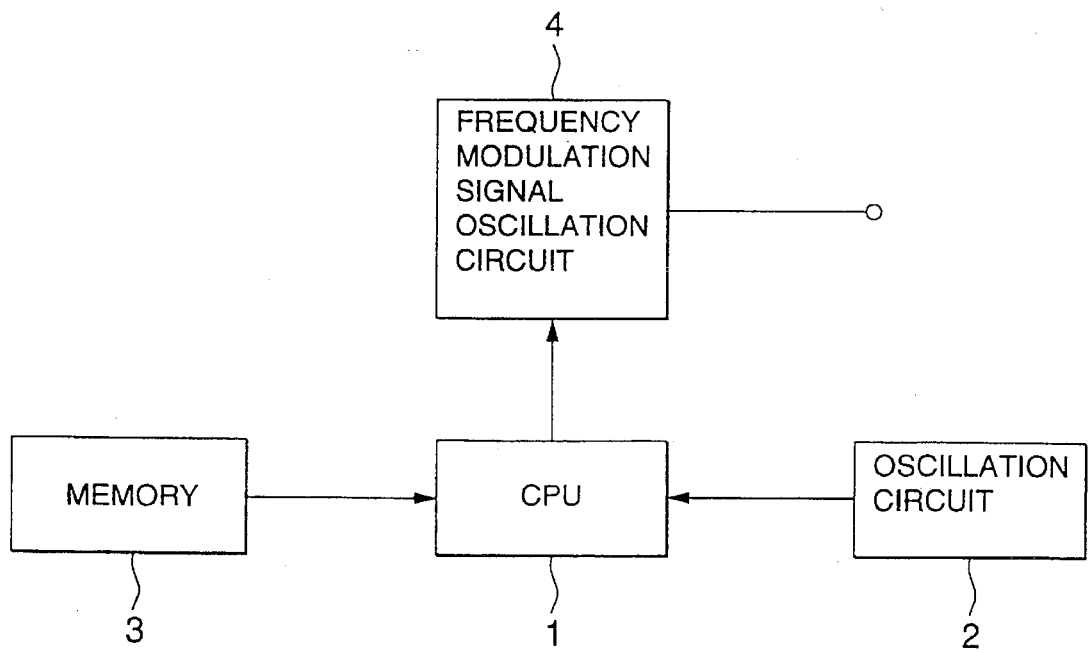
FIG. 3 is a block diagram of a conventional transmitting device.

Referring now to a timing chart shown in FIG. 2, FIG. 2(a) illustrates the "1" or "0" level of every bit of the identification code that is read out from the EEPROM 15. FIG. 2(b) shows the on or off state of the control signal that the operation control part 12 gives the switching element 11 in accordance with the level of FIG. 2(a). FIG. 2(c) shows variations in the oscillation frequencies that the oscillation circuit 13 outputs in accordance with the on or off state of the control signal shown in FIG. 2(b), that is, the oscillation frequency is F1 when the control signal of FIG. 2(b) is off and, the oscillation frequency is F2 when the control signal is on. FIG. 2(d) shows the frequency that the frequency dividing circuit 14 outputs after it divides the output frequency of FIG. 2(c) into m parts, that is, the output frequency f1 is output for the output frequency F1 of FIG. 2(c), while the output frequency f2 is output for the output frequency F2 of FIG. 2(c).

As has been described heretofore, according to the invention, there is provided a transmitting device structured such that it applies a switching signal to the oscillation circuit 13, which supplies a clock signal to the operation control part 12, in accordance with variations in the levels of the identification code to thereby switch the oscillation frequency of the clock signal and thus provide a new clock signal having a different oscillation frequency and, in accordance with the new clock signal obtained by switching the oscillation frequency, produces a frequency modulation signal. This eliminates the need for provision of the conventional oscillation circuit which has been employed for special purpose of outputting a frequency modulation signal, so that the transmitting device can be produced more compactly and at lower costs.

Here, the invention is not limited to only the embodiment described above and illustrated in the drawings but the following modifications are also possible.

That is, according to the illustrated embodiment, the transmitting device is structured such that, in order to apply the control signal to the oscillation circuit in accordance with the variations in the levels of the identification code, the control signal is off for the level "1", while the control signal is on for the level "0". However, the transmitting device may be structured such that the correspondence between the levels "1", "0" and the on and off of the control signal may be reversed.

In the illustrated embodiment, in order to switch the oscillation frequency, the connection of the capacitor 10 is switched to thereby switch the electrostatic capacity of the capacitor 10. However, alternatively, the inductance of the coil may be switched.

Also, as the oscillation circuit, the coil and capacitor are used to make a Colpitts oscillation circuit. However, a Hartley oscillation circuit may be formed instead of the Colpitts oscillation circuit.

Further, as the oscillation circuit, alternatively, there may be used a clock driver which has two kinds of oscillation frequencies. Also, as a method for switching the oscillation frequency, as input signal to be given to the output of a line selector in which the two kinds of oscillation frequencies are input may be switched.

In the illustrated embodiment, to output a frequency modulation signal as an electric wave signal, the frequency modulation signal is output after the oscillation frequency of the oscillation circuit 13 is divided by the frequency dividing circuit 14. However, the signal may be output directly without dividing the oscillation frequency of the oscillation circuit 13.

In addition, to store the identification code, a mask ROM may be used instead of the EEPROM. Also, there may be provided a storage area in the ROM for storing the control program of the control means, and the identification code may be stored in the storage area.

In the illustrated embodiment, there is shown a case in which the present invention is applied to a transmitting device incorporated in the electric wave key of a car. However, the invention is not limited to the car but can also be applied to vehicles in general. Further, the invention is not limited to the vehicles in general but can also be applied to any transmitting device, provided it employs a frequency modulation system.

Since the present invention is structured in the above-mentioned manner, there can be obtained the following effects.

That is, according to a transmitting device, since the present transmitting device is structured such that the oscillation frequency of the oscillation circuit used to output the clock signal of the control means can be switched and the oscillation frequency of the oscillation circuit can be switched by the control means in accordance with a digital transmitting signal, there is eliminated the need for special provision of an oscillation circuit which is used to output a frequency modulation signal as well as the transmitting device can be produced more compactly and at lower costs.

Also, according to a transmitting device, since the oscillation circuit is structured such that the oscillation frequency thereof can be changed by connecting a capacitor to a resonance circuit consisting of a coil and a capacitor, the transmitting device can be produced simply and at lower cost.

Further, according to a transmitting device, it is possible to output a frequency modulation signal having a different frequency from the frequency of a clock signal by providing a frequency dividing circuit.

What is claimed is:

1. A transmitting device for a frequency modulated digital transmission signal comprising:

an oscillation circuit for providing a clock signal of a switchable oscillation frequency; and an operation controller for generating a frequency modulation signal in accordance with said clock signal from said oscillation circuit by applying a switching signal corresponding to variations in the level of a digital signal to said oscillation circuit to switch the oscillation frequency of said oscillation circuit.

2. The transmitting device as set forth in claim 1, wherein said oscillation circuit includes a resonance circuit having a combination of a coil and a capacitor, and a switching capacitor connectable to said resonance circuit so as to switch said oscillation frequency when said switching signal is applied thereto from said operation controller.

3. A transmitting device for a frequency modulated digital transmission signal comprising:

an oscillation circuit for providing a clock signal of a switchable oscillation frequency;

an operation controller for generating a frequency modulation signal in accordance with said clock signal from said oscillation circuit by applying a switching signal corresponding to variations in the level of a digital signal to said oscillation circuit to switch the oscillation frequency of said oscillation circuit; and a frequency dividing circuit for performing a given frequency dividing processing on said clock signal generated by said oscillation circuit and for outputting said frequency modulated signal.

4. The transmitting device as set forth in claim 2, further comprising a frequency dividing circuit for performing a given frequency dividing processing on said clock signal generated by said oscillation circuit and for outputting said frequency modulated signal.

5. The transmitting device as set forth in claim 3, wherein said oscillation circuit includes a resonance circuit having a combination of a coil and a capacitor, and a switching capacitor connectable to said resonance circuit so as to switch said oscillation frequency when said switching signal is applied thereto from said operation controller.

6. The transmitting device as set forth in claim 1, wherein said frequency modulated signal is transmitted to a car as a remote control signal.

7. The transmitting device as set forth in claim 3, wherein said frequency modulated signal is transmitted to a car as a remote control signal.

\* \* \* \* \*